United States Patent [19]

Kuroda

[11] 4,061,509

[45] * Dec. 6, 1977

[54] HIGH PERMEABILITY, LONG WEARING MAGNETIC HEAD ALLOY

[75] Inventor: Nobukazu Kuroda, Yokohama, Japan

[73] Assignee: Sony Corporation, Tokyo, Japan

[ * ] Notice: The portion of the term of this patent subsequent to Sept. 7, 1993, has been disclaimed.

[21] Appl. No.: 703,245

[22] Filed: July 7, 1976

Related U.S. Application Data

[63] Continuation-in-part of Ser. No. 480,116, June 17, 1974, abandoned, and Ser. No. 544,674, Jan. 28, 1975, Pat. No. 3,979,233.

[30] Foreign Application Priority Data

Feb. 5, 1974 Japan ................................ 49-14747

[51] Int. Cl.[2] ........................ C04B 35/00; C22C 19/05

[52] U.S. Cl. ................................ 148/31.55; 75/171; 148/120; 148/121

[58] Field of Search ...................... 75/171, 170, 31.55, 75/120, 121, 100, 101

[56] References Cited

U.S. PATENT DOCUMENTS

| | | | |
|---|---|---|---|
| 1,910,309 | 5/1933 | Smith et al. | 148/31.55 |
| 3,264,100 | 8/1966 | Ichinose et al. | 148/31.55 |
| 3,348,983 | 10/1967 | Odani et al. | 148/120 |
| 3,582,408 | 6/1971 | Onyshkevych | 148/31.55 |
| 3,794,530 | 2/1974 | Masumoto et al. | 148/31.55 |
| 3,837,844 | 9/1974 | Makita et al. | 148/31.55 |
| 3,837,933 | 9/1974 | Masumoto et al. | 148/31.55 |
| 3,844,849 | 10/1974 | Kuroda | 148/31.55 |
| 3,979,233 | 9/1976 | Kuroda | 148/31.55 |

FOREIGN PATENT DOCUMENTS

| | | | |
|---|---|---|---|
| 46-33381 | 9/1971 | Japan | 148/31.55 |
| 1,086,674 | 10/1967 | United Kingdom | 148/31.55 |

OTHER PUBLICATIONS

Bozorth, R; *Ferromagnetism,* New York, 1951, pp. 148–152.

*Primary Examiner*—Walter R. Satterfield
*Attorney, Agent, or Firm*—Hill, Gross, Simpson, Van Santen, Steadman, Chiara & Simpson

[57] ABSTRACT

A magnetic alloy having superior effective permeability and good wear resistance characteristics for a magnetic head member consisting essentially of from 79 to 85 weight percent nickel, from 2 to 6 weight percent chromium, from 1 to 10 weight percent germanium, from and including 0 to 4 weight percent manganese, and from 9 to 17 weight percent iron.

1 Claim, 10 Drawing Figures

$Ni_{85}Fe_{15-x-y}Cr_xGe_y$ $Ni_{80}Fe_{14-\delta}Cr_5Ge_1Mn_\delta$ $Ni_{80}Fe_{13.5-\delta}Cr_4Ge_{2.5}Mn_\delta$

HIGH PERMEABILITY, LONG WEARING MAGNETIC HEAD ALLOY

RELATED APPLICATION

This application is a continuation-in-part of my copending applications Ser. No. 480,116, filed June 17, 1974, and now abandoned; and Ser. No. 544,674 filed January 28, 1975, and now U.S. Pat. No. 3,979,233.

BACKGROUND OF THE INVENTION

Hitherto, a magnetic alloy containing nickel and iron (available commercially under the trademark "Permalloy") which is high in permeability has been widely used as the core material of a magnetic head. Such an alloy is superior in magnetic characteristics but is bad in wear resistance. A magnetic head made of Permalloy type alloy is much abraded when used for recording and/or reproducing on and/or from a magnetic tape which uses powders of chromium dioxide ($CrO_2$) as magnetic powders, and such tapes have been widely used recently. Thus, such a magnetic head not only cannot be used for a long time period but also experiences changes in electric characteristics as a magnetic head during its use life.

To this end, a magnetic alloy which is improved in wear resistance has been proposed, but this magnetic alloy is bad in magnetic characteristics and is difficult to heat treat during manufacturing. Accordingly, such magnetic alloy has not been used generally.

SUMMARY OF THE INVENTION

This invention is directed to a magnetic alloy, and, more particularly, to a soft magnetic alloy with superior effective permeability and good wear resistance characteristics for use in a magnetic head.

It is an object of this invention to provide a magnetic alloy which is superior in wear resistance characteristics yet has smaller than 0.07 Oersted in coercive force Hc, greater than 6000 Gausses in magnetic flux density $B_{10}$ ($B_{10}$ being the magnetic flux density measured at 10 Oe.), greater than 4000 in initial permeability $\mu_o$, and greater than 60 $\mu\Omega$-cm in specific resistance $\rho$, such alloy being preferred for use with the material of the core of a magnetic head.

It is another object of this invention to provide a magnetic alloy which is easily manufactured and good in rolling properties.

It is a further object of this invention to provide a magnetic alloy which is preferred for use with a magnetic shielding material.

Other objects, features, advantages and the like of this invention will become apparent to those skilled in the art from the following description taken in conjunction with the accompanying drawings.

DESCRIPTION OF PREFERRED EMBODIMENTS

With reference to the drawings, the static magnetic characteristics, specific resistance, hardness and wear resistance of the magnetic material according to this invention will be now described.

Figure 1:
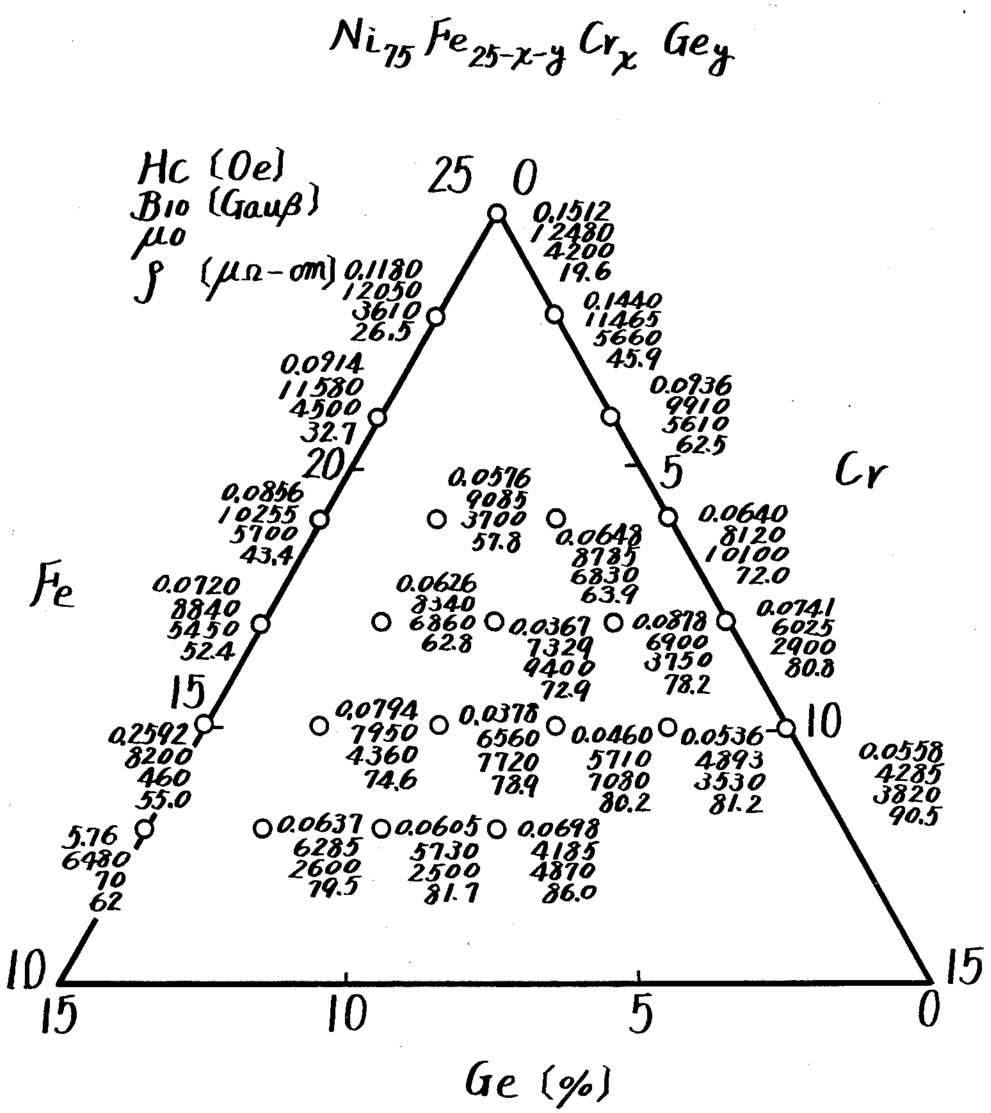
FIG. 1 is a composition diagram of a quadruple or quaternary alloy $Ni_{75}Fe_{25-x-y}Cr_xGe_y$ which has undergone a cooling treatment in a furnace.

FIG. 1 is a composition diagram showing coercive force Hc, magnetic flux density $B_{10}$ (magnetic flux density at 10 Oersteds), initial permeability $\mu_O$, and specific resistance $\rho$ values of a so-called quadruple type alloy $Ni_{75}Fe_{25-x-y}Cr_xGe_y$ as illustrated by the respective specific compositions indicated, each such individual alloy composition having been obtained by a preparation procedure involving a final annealing comprising a cooling treatment in a furnace. Such an alloy, as indicated, comprises 75 weight percent of nickel (Ni) (as a constant value), x- weight percent of chromium (Cr), y- weight percent of germanium (Ge), and the balance up to 100 weight percent of any given such alloy composition being iron (Fe). The numerical values in FIG. 1 indicate Hc, $B_{10}$, $\mu_O$ and $\rho$, respectively, from above to below.

Figure 2:
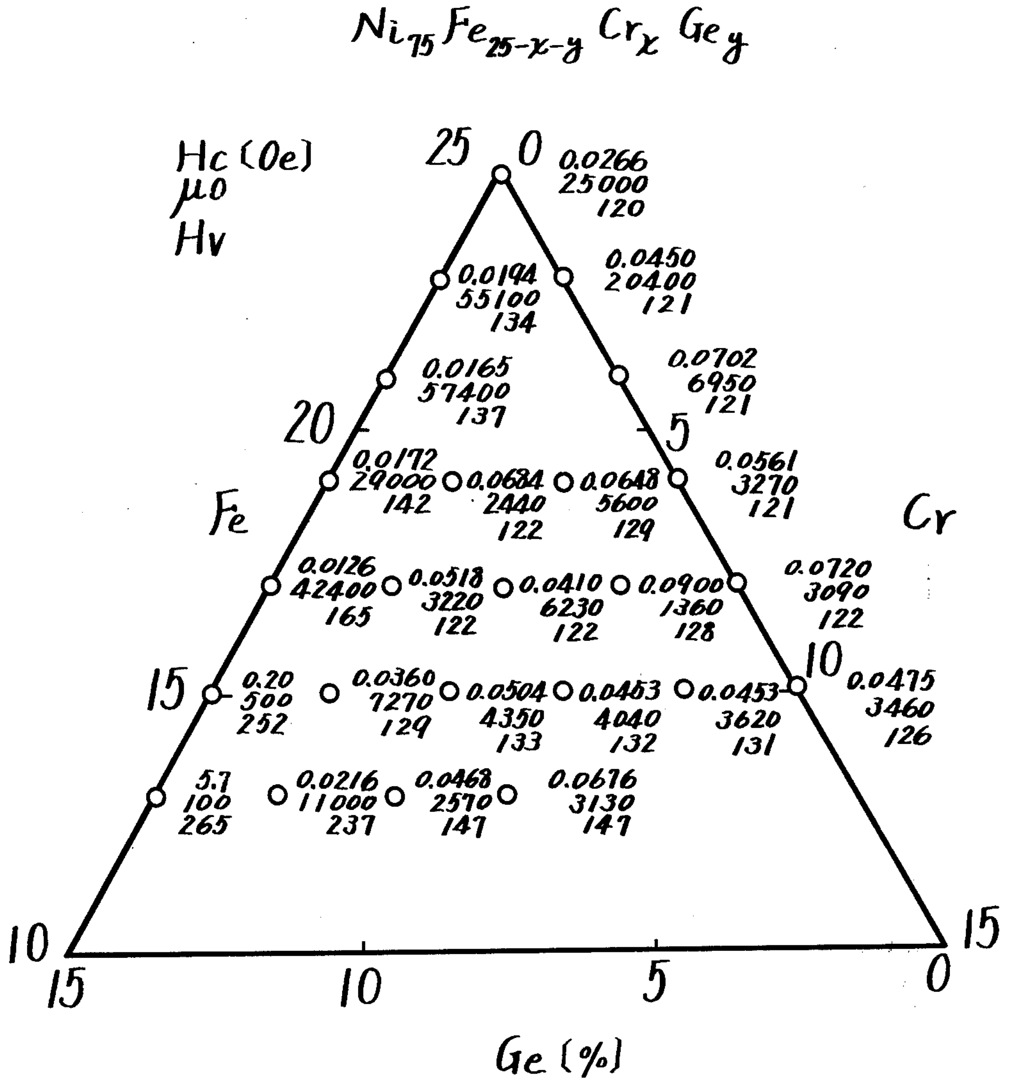
FIG. 2 is a composition diagram of a quadruple alloy $Ni_{75}Fe_{25-x-y}Cr_xGe_y$ which has undergone a rapid cooling treatment.

FIG. 2 is a composition diagram showing coercive force Hc, initial permeability $\mu_O$ and Vicker's hardness Hv values of such a quadruple type alloy $Ni_{75}Fe_{25-x-y}Cr_xGe_y$ as shown in FIG. 1 except that here each such individual alloy composition has been obtained by a preparation procedure involving a final annealing comprising a rapid cooling treatment. The numerical values in FIG. 2 indicate Hc, $\mu_O$, and Hv, respectively, from above to below.

Figure 3:
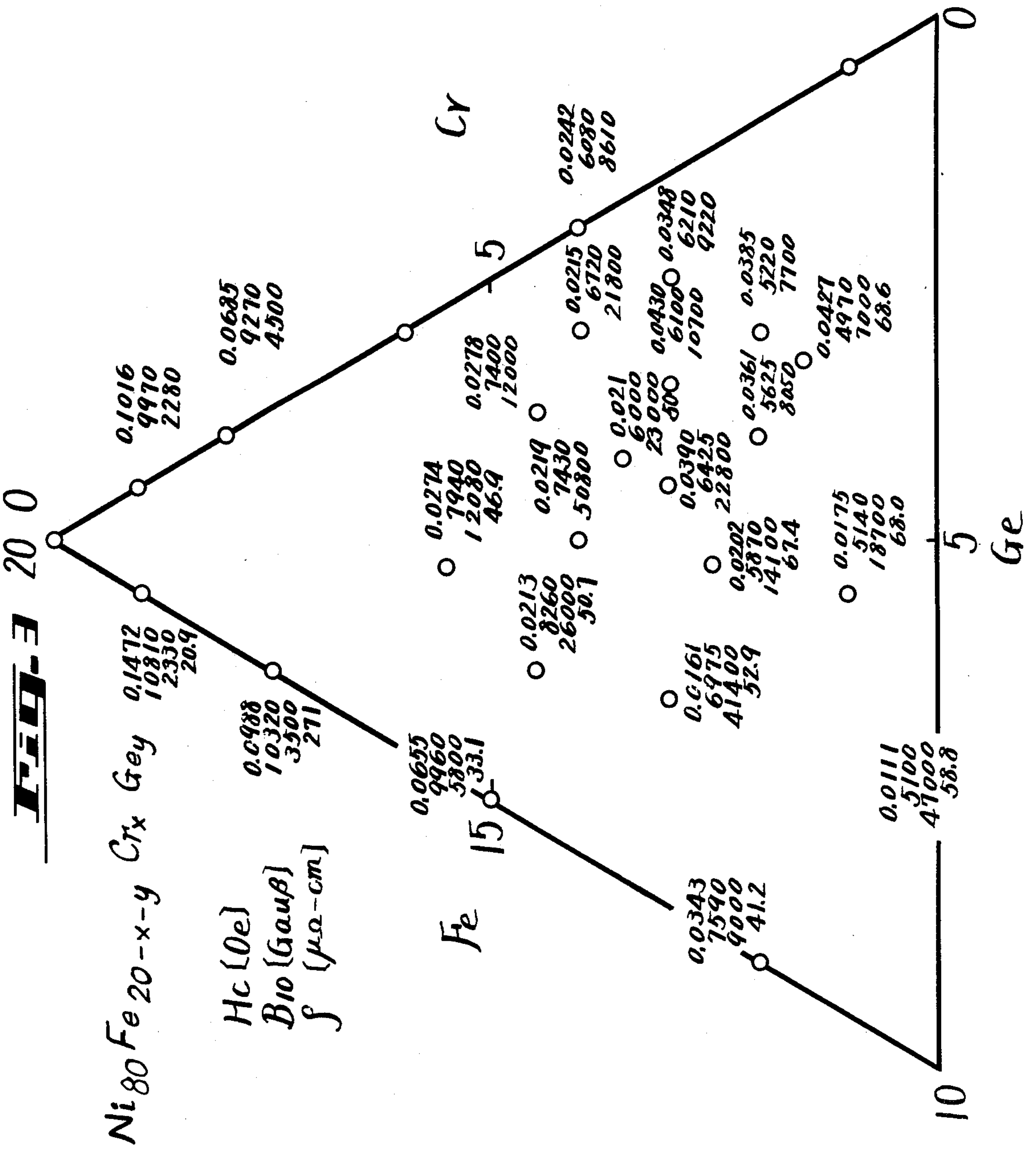
FIG. 3 is a composition diagram in the vicinity of a quadruple alloy $Ni_{80}Fe_{20-x-y}Cr_xGe_y$.

FIG. 3 is a composition diagram showing coercive force Hc, magnetic flux density $B_{10}$, initial permeability $\mu_O$ and specific resistance $\rho$ values for specific compositions in the vicinity of a quadruple alloy $Ni_{80}Fe_{20-x-y}Cr_xGe_y$ which are all obtained by a preparation procedure involving a final annealing comprising a furnace cooling treatment (or cooling treatment in a furnace). The numerical values in FIG. 3 indicate Hc, $B_{10}$, $\mu_O$ and $\rho$, respectively, from above to below.

Figure 4:
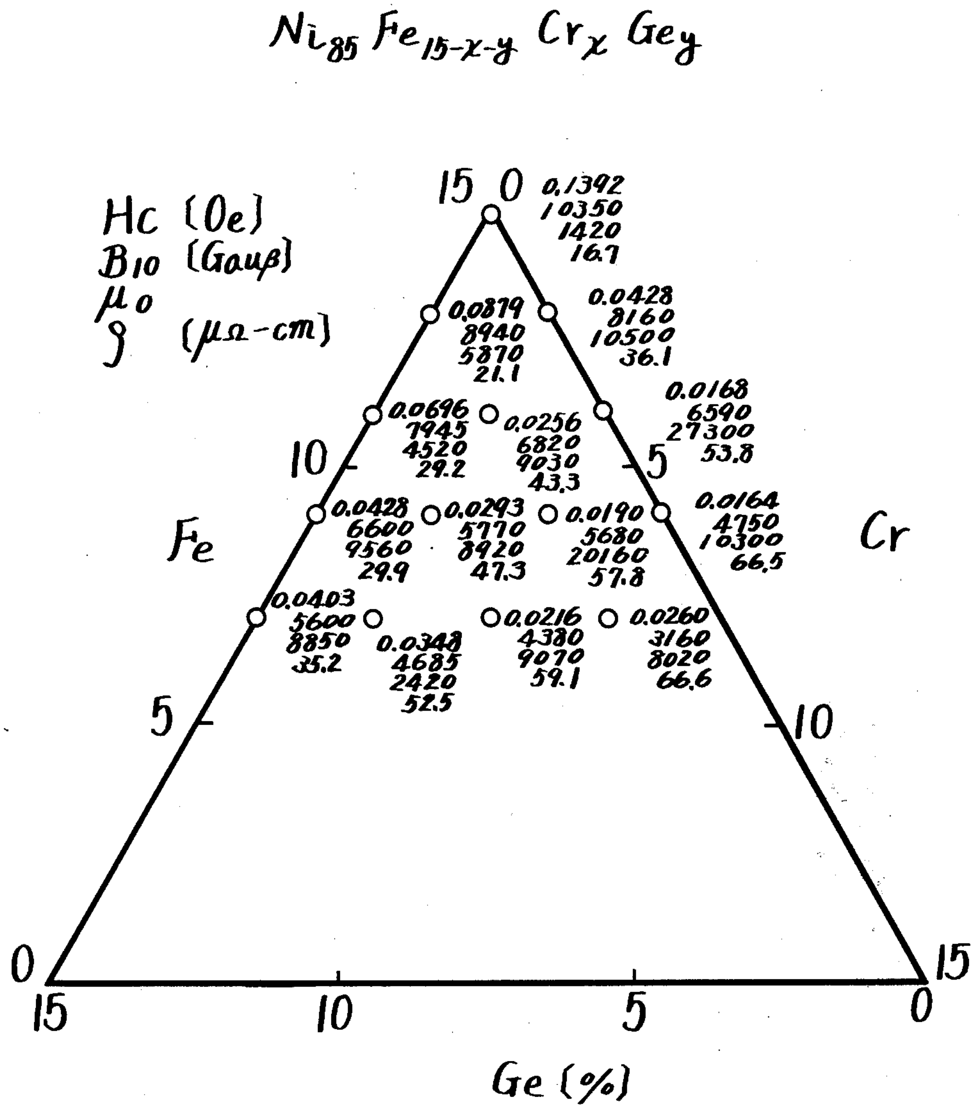
FIG. 4 is a composition diagram of a quadruple alloy $Ni_{85}Fe_{15-x-y}Cr_xGe_y$ which has undergone a cooling treatment in a furnace.

FIG. 4 is a composition diagram showing coercive force Hc, magnetic flux density $B_{10}$, initial permeability $\mu_O$, and specific resistance $\rho$ values of a so-called quadruple type alloy $Ni_{85}Fe_{15-x-y}Cr_xGe_y$ as illustrated by the respective specific compositions, indicated, each such individual alloy composition having been obtained by a preparation procedure involving a final annealing comprising a cooling treatment in a furnace. Such an alloy, as indicated, comprises 85 weight percent of Ni (as a constant value), $x$ weight percent of Cr, $y$ weight percent of Ge, and the balance up to 100 weight percent of any given such alloy composition being Fe. The numerical values in FIG. 4 indicate Hc, $B_{10}$, $\mu_O$, and $\rho$, respectively, from above to below.

Figure 5:
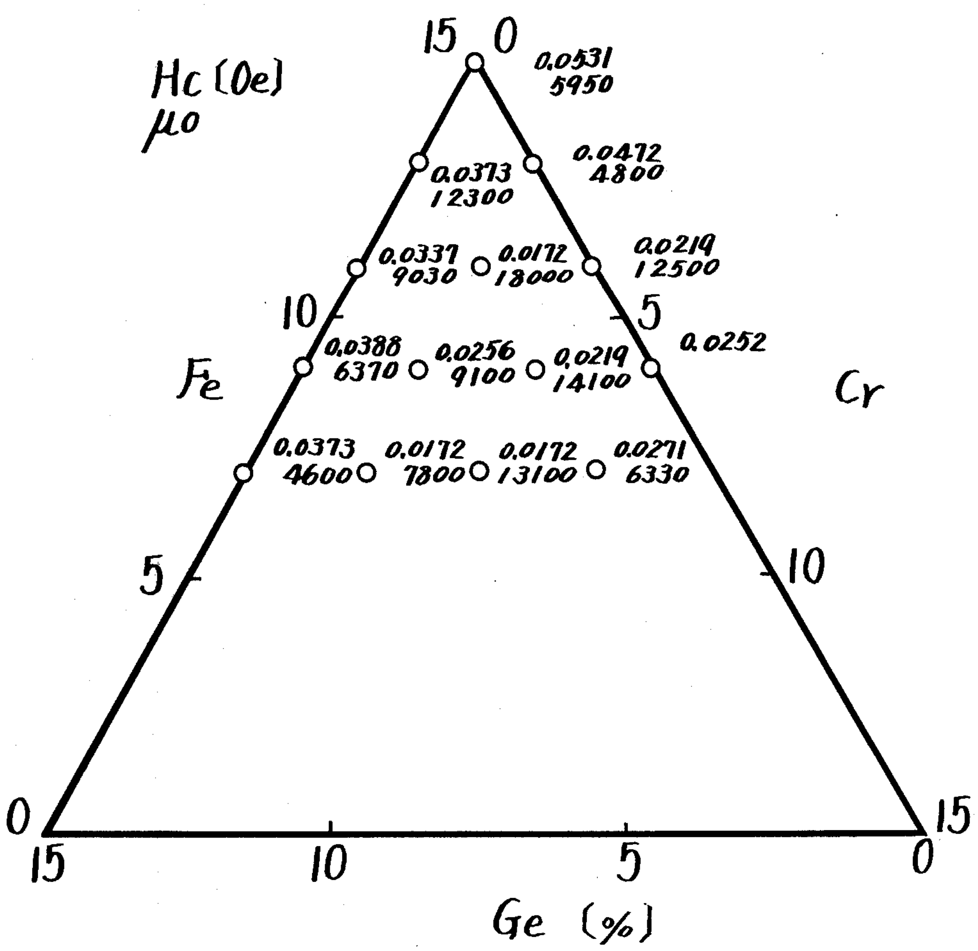
FIG. 5 is a composition diagram of a quadruple alloy $Ni_{85}Fe_{15-x-y}Cr_xGe_y$ which has undergone a rapid cooling treatment.

FIG. 5 is a composition diagram showing coercive force Hc and initial permeability $\mu_O$, of such quadruple type alloy $Ni_{85}Fe_{15-x-y}Cr_xGe_y$ as shown in FIG. 4 except that each such individual alloy composition has been obtained by a preparation procedure involving a final annealing comprising a rapid cooling treatment. The numerical values in FIG. 5 indicate Hc and $\mu_O$, respectively, from above to below, respectively.

Figure 6:
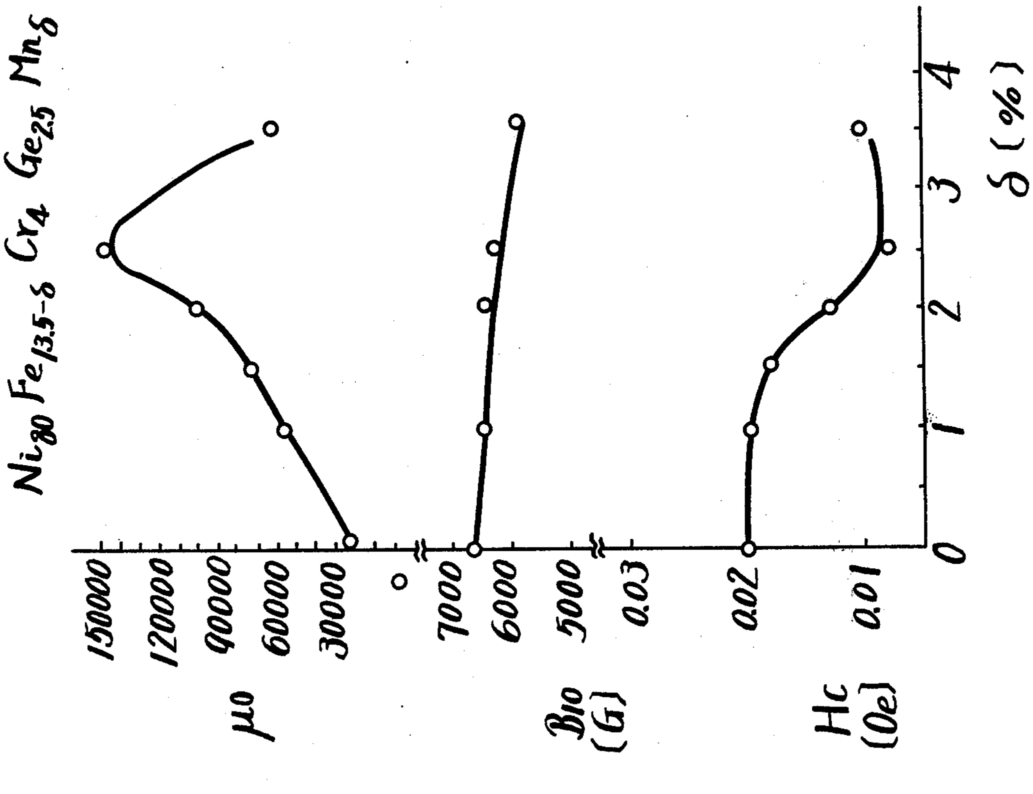
FIG. 6 is a graph showing static magnetic characteristics of a quintuple alloy $Ni_{80}Fe_{13.5-\delta}Cr_4Ge_{2.5}Mn_\delta$.

FIG. 6 is a graph showing coercive force Hc, magnetic flux density $B_{10}$, and initial permeability $\mu_O$ values of a so-called quintuple type alloy $Ni_{80}Fe_{13.5-\delta}Cr_4Ge_{2.5}Mn_\delta$, as illustrated by the respective specific compositions indicated. Such an alloy, as indicated, comprises 80 weight percent of Ni, 4 weight percent of Cr, 2.5 weight percent of Ge (Ni, Cr and Ge being constant), $\delta$ weight percent of manganese (Mn) (this being a varied amount), and the balance up to 100 weight percent of any given such alloy composition being Fe.

Figure 7:
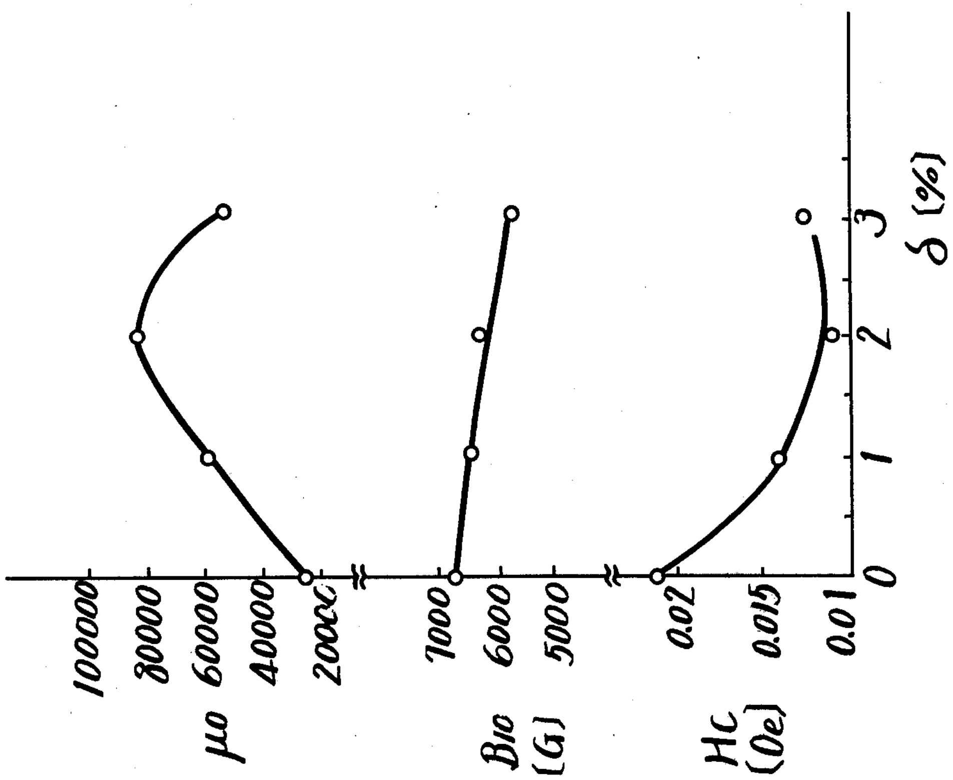
FIG. 7 is a graph showing static magnetic characteristics of a quintuple alloy $Ni_{80}Fe_{14-\delta}Cr_5Ge_1Mn_\delta$.

FIG. 7 is a graph, similar to that of FIG. 6, showing coercive force Hc, magnetic flux density $B_{10}$ and initial permeability $\mu_O$ values of such a quintuple alloy $Ni_{80}Fe_{14-\delta}Cr_5Ge_1Mn_\delta$ as shown in FIG. 6 except that here the added amount of Cr is increased.

As may be apparent from FIGS. 1 to 7, the static magnetic characteristics, specific resistance, hardness, and other indicated respective values of such quintuple type alloy NiFe Cr Ge Mn according to this invention depend upon the specific composition thereof.

As to the static magnetic characteristics, on the one hand, if the amount of Ni employed is low, such as 75 weight percent, the coercive force Hc in particular increases, but the initial permeabiluty $\mu_O$ decreases which effectively deteriorates the magnetic characteristics as a whole, as shown in FIGS. 1 and 2. As shown in FIG. 3 or 4 and FIG. 5, if on the other hand, the amount of Ni employed is high, such as 80 or 85 weight percent, the coercive force Hc decreases, but the initial permeability $\mu_O$ increases which effectively improves the magnetic characteristics as a whole.

As may be obvious from FIGS. 6 and 7, by adding Mn to such a quadruple type alloy NiFeCrGe, the coercive force Hc further decreases, but the initial permeability $\mu_O$ increases which effectively improves the magnetic characteristics as a whole. Further, it is ascertained that such an improvement of magnetic characteristics by addition of Mn can be also achieved in a quadruple alloy wherein Cr is high in added amount.

FIGS. 1 and 4 are graphs showing the magnetic characteristics of the alloys subjected to a furnace cooling treatment at final annealing which is desired from a practical point of view, but FIGS. 2 and 5 are graphs showing the magnetic characteristics of the alloys subjected to a rapid cooling treatment which generally avoids the formation of magnetic anisotropy. As may be apparent from FIGS. 1, 2, 4 and 5, if Cr is added in a weight percent of about 2 to 3, the coercive force Hc decreases and the formation of magnetic anisotropy is avoided irrespective of furnace cooling treatment and rapid cooling treatment. Accordingly, a magnetic material of this invention can be finally annealed by furnace cooling which is easy and convenient in accomplishing alloy heat treatment.

A composition of this invention which has good magnetic characteristics exists at the side of a composition diagram where the amount of Ge added is large (8 weight percent) and at the side where the amount of Cr added is large (4 to 5 weight percent), as shown in FIG. 3. In this case, it is noted that the former is high in hardness and the latter is improved in wear resistance by addition of Cr.

As to specific resistance, it may be obvious from FIGS. 1 and 4 that the specific resistance increases with increasing amounts of Cr which thereby decreases the eddy current losses in a magnetic material of this invention.

As to hardness, it may be obvious from the Vicker's hardness data shown in FIG. 2 that hardness becomes high by the addition of Ge and Cr, respectively. Also, it is noted that magnetostriction and magnetic anisotropy decrease, and the reproduceability of magnetic characteristics is improved, by addition of Ge. Further, the rolling characteristic of a magnetic material of this invention is improved by adding Mn thereto.

It is desirable that a magnetic material used for a magnetic head have its coercive force Hc be in the vicinity of about 0.07 oersteds or even smaller, its magnetic flux density $B_{10}$ be more than about 6000 Gausses, its initial permeability $\mu_O$ be greater than about 4000, and its specific resistance $\rho$ be greater than about $60\mu\Omega$-cm.

If the foregoing is taken into account, it is preferred in this invention that, in the quintuple type alloy NiFeCrGeMn, the amount of Ni range from 79 to 85 weight percent, and that the amount of Cr range from 2 to 6 weight percent, respectively. When the added amount of Cr is smaller than 2 weight percent, the coercive force Hc increases, and the wear resistance deteriorates, while, when greater than 6 weight percent Cr is employed, the magnetic flux density $B_{10}$ deteriorates. The added amount of Ge is preferably selected to be in the range from 1 to 10 weight percent. When the added amount of Ge is smaller than about 1 weight percent, the reproduceability of the desired characteristics becomes bad, while when such is greater than 10 weight percent, the coercive force Hc increases, and Ge is deposited instead of being replaced. The added amount of Mn is preferably in the range of from 0 to and including 4 weight percent. When the added amount of Mn is greater than 4 weight percent, magnetic flux density $B_{10}$ deteriorates and magnetic anisotropy becomes great. When the amount of iron is below 9 weight percent, magnetic flux density $B_{10}$ deteriorates, as is illustrated by FIGS. 4 and 5, for examples, and when the amount of iron is above 17 weight percent, coercive force rises to high values, and initial permeability deteriorates, as is illustrated by FIGS. 1 and 3, for examples.

Figure 8:
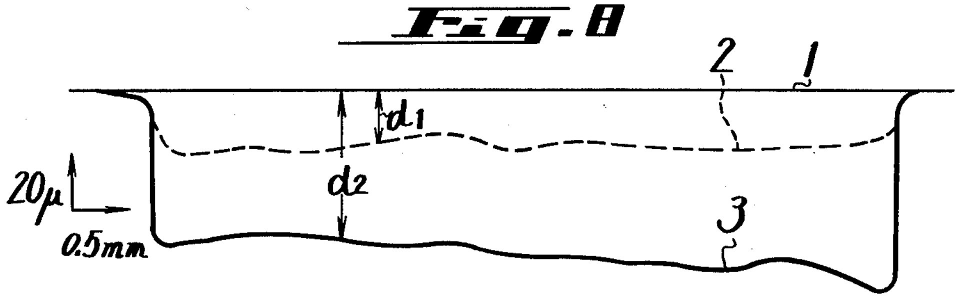
FIG. 8 is a diagram showing the results of abrasion tests of a magnetic alloy material according to this invention in comparison to a prior art Permalloy type alloy.
Figure 9:
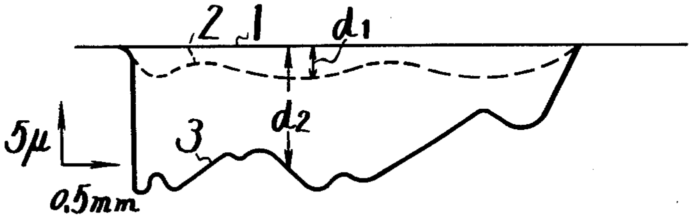
FIG. 9 is a diagram similar to FIG. 8 but showing additional such test results.

FIGS. 8 and 9 are diagrams showing the results of abrasion tests of typical compositions of the invention, or the quintuple alloy $Ni_{80}Fe_{10}Cr_{5.5}Ge_2Mn_{2.5}$, as compared with a prior art Permalloy. FIG. 8 shows abraded amounts $d_1$ and $d_2$ of dummy cores, which are formed by laminating a plurality of cores each with thickness of 0.145 mm, when an ordinary magnetic tape is drawn over in contact with such composite of dummy cores at a speed of 19 cm/sec for 234 hours (where the magnetic tape is replaced with a new one every 50 hours). In FIG. 8, reference numeral 1 designates a contact surface of the dummy core with which the tape does not contact yet, or a reference surface, reference numeral 2 designates an abraded contact surface of a dummy core formed of such a magnetic material of this invention after such tests, and reference numeral 3 designates an abraded contact surface of a dummy core formed of a prior art Permalloy after tests. FIG. 9 shows abraded amounts $d_1$ and $d_2$ from dummy cores which are formed by laminating a plurality of cores each with a thickness of 0.10 mm, when a cassette tape is drawn over in contact with such composite of dummy cores at a speed of 4.8 cm/sec for 150 hours (where the cassette tape is replaced with a new one every 50 hours). In FIG. 9, reference numerals corresponding to those used in FIG. 8 indicate the corresponding surfaces, respectively. From FIGS. 8 and 9, it will be apparent that a magnetic material according to this invention is superior in wear resistance.

Figure 10:
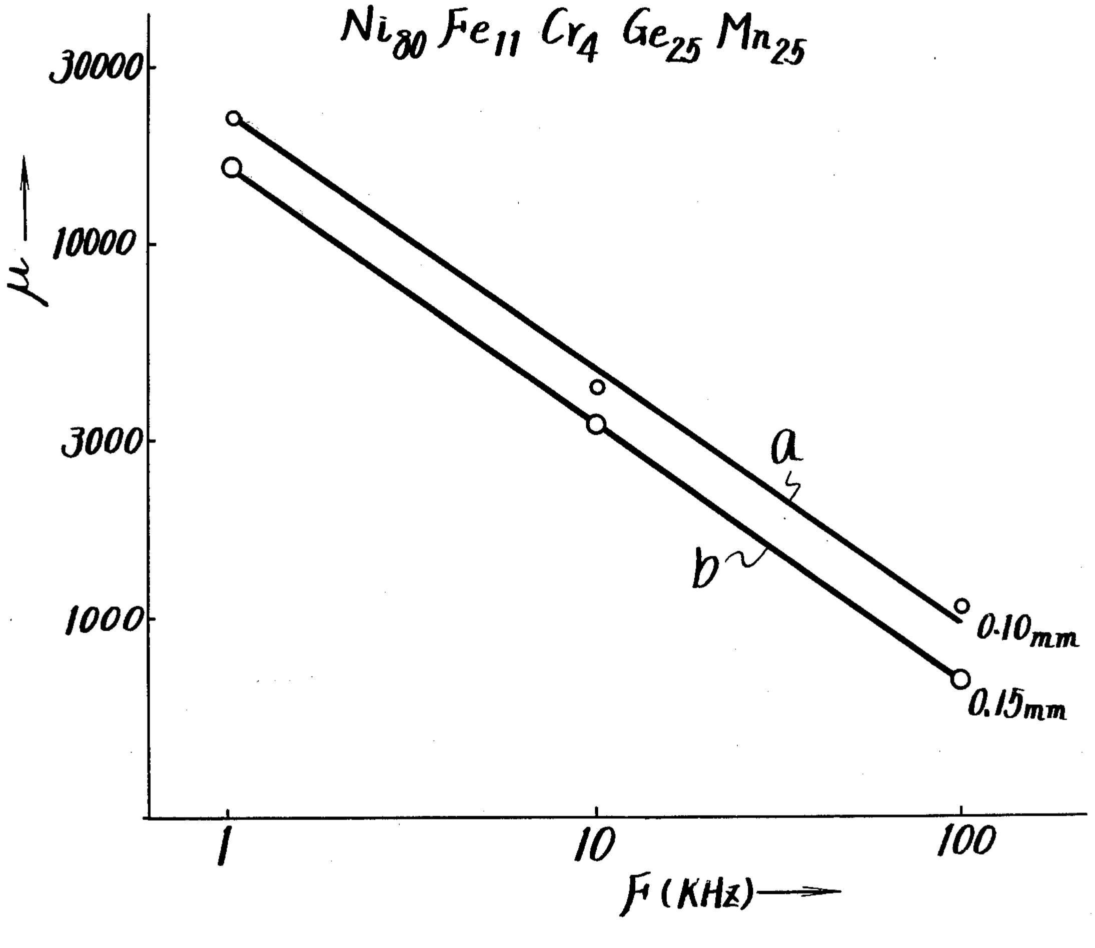
FIG. 10 is a graph showing the characteristic relationship between permeability and frequency for a magnetic alloy material of this invention.

FIG. 10 is a graph showing the permeability-frequency characteristics of a typical composition of this invention or quintuple alloy $Ni_{80}Fe_{11}Cr_4Ge_{2.5}$ in the form of a thin plate. The graph ordinates represent the permeability $\mu$, and the abscissae represent the frequency F in KHz, respectively. From the graph of FIG. 10, it will be noted that the permeability-frequency characteristics are superior, and the magnetorestriction and the magnetic anisotropy are both small. In FIG. 10, a line *a* shows the frequency characteristic of the magnetic material in the form of a thin plate with a thickness of 0.10 mm, and a line *b* shows such frequency characteristic for such a magnetic material in the form of a thin film with a thickness of 0.15 mm.

The next table I shows effective permeability of typical compositions of this invention, comparative composition which does not contain Ge and prior art Permalloy, measured at the frequencies; 1 KHz, 10 KHz, 100 KHz.

TABLE I

| | | Effective Permiability | | |
|---|---|---|---|---|
| Ex. | Composition | 1 KHz | 10 KHz | 100 KHz |
| 1 | 80Ni4Cr$_{2.5}$Ge1.9Mn11.6Fe | 40000 | 7350 | 1440 |
| 2 | 80Ni4Cr$_{1.25}$Ge0.9Mn13.85Fe | 37200 | 6550 | 1350 |
| 3 | 80Ni4Cr0.9Mn15.1Fe (not containing Ge) | 30500 | 5880 | 1270 |
| 4 | 81Ni4Cr$_{2.5}$Ge1.9Mn10.6Fe | 34200 | 6800 | 1400 |
| 5 | 80Ni5Mo15Fe | 28200 | 4770 | 950 |

In the Table I, Examples 1, 2 and 4 are compositions of this invention. Further, as shown in the Table I, the effective permeability increases in accordance with the addition of germanium (Ge).

As may be apparent from the above description, according to this invention, there is obtained a magnetic material which is superior in effective permeability characteristics, static magnetic characteristics, and wear resistance, which has high specific resistance, and which also is easy in rolling, so that a magnetic material of this invention is effective for use in a magnetic recording and reproducing head for a magnetic tape with chromium dioxide ($CrO_2$) and has high coercive force for use with a shield case.

In the foregoing, a magnetic material of this invention is formed of Fe, Ni, Cr, Ge and Mn, but it will be obvious to those skilled in the art that small amounts of other metals such as titanium (Ti), tungsten (W), molybdenum (Mo) or the like can be added to such material to improve other characteristics.

It will be apparent that many modifications and variations can be made by those skilled in the art without departing from the spirit and scope of the novel concepts of this invention.

I claim as my invention:

1. A magnetic alloy having superior effective permeability and good wear resistance characteristics for a magnetic head member consisting essentially of, on a 100 weight percent basis, from 79 to 85 weight percent nickel, from 2 to 6 weight percent chromium, from 1 to 10 weight percent germanium, from and including 0 to 4 weight percent manganese, and from 9 to 17 weight percent iron, said alloy being characterized by having a coercive force smaller than 0.07 Oersted, a magnetic flux density greater than 6,000 Gausses at 10 Oersteds, an initial permeability greater than 4,000, and a specific resistance greater than 60$\mu\Omega$-cm.

* * * * *